United States Patent
Siegrist et al.

(12)

(10) Patent No.: US 7,075,921 B2
(45) Date of Patent: Jul. 11, 2006

(54) REMOTE MEDIA CONTROL FOR VOICE OVER INTERNET TELEPHONY AND RELATED APPLICATIONS

(75) Inventors: Joseph Siegrist, Silver Spring, MD (US); Amen Zwa, Owings Mills, MD (US)

(73) Assignee: eStara, Inc., Reston, VA (US)

( * ) Notice: Subject to any disclaimer, the term of this patent is extended or adjusted under 35 U.S.C. 154(b) by 808 days.

(21) Appl. No.: 09/771,992

(22) Filed: Jan. 30, 2001

(65) Prior Publication Data

US 2002/0101854 A1 Aug. 1, 2002

(51) Int. Cl.
*H04L 12/66* (2006.01)
*H03G 3/20* (2006.01)

(52) U.S. Cl. ............ 370/352; 379/388.07; 379/390.01; 381/57; 381/95

(58) Field of Classification Search ................ 370/230, 370/351–356, 389, 401, 410, 465–466; 379/88.01, 379/121.04, 207.02, 219, 221.06, 221.15, 379/227, 265.03, 265.09, 265.11, 388.07, 379/390.01, 420.03; 381/56, 57, 58, 60, 381/82, 83, 92, 93, 94.5, 94.8, 94.9, 95
See application file for complete search history.

(56) References Cited

U.S. PATENT DOCUMENTS

| 5,296,643 | A | * | 3/1994 | Kuo et al. ............... 434/307 A |
| 5,421,009 | A | | 5/1995 | Platt |
| 5,604,737 | A | | 2/1997 | Iwami et al. |
| 5,608,786 | A | | 3/1997 | Gordon |
| 5,666,407 | A | * | 9/1997 | Pfeifer ................... 379/406.02 |
| 5,742,596 | A | | 4/1998 | Baratz et al. |
| 5,751,706 | A | | 5/1998 | Land et al. |
| 5,764,756 | A | | 6/1998 | Onweller |

(Continued)

FOREIGN PATENT DOCUMENTS

EP 0 843 454 5/1998

(Continued)

OTHER PUBLICATIONS

Hansson, A. et al. "Phone Doubler—A step towards integrated Internet and telephone communities", Ericsson Review, SE, Ericsson. Stockholm, No. 4, 1997, pp. 142-151, XP000725693, ISSN: 0014-0171, pp. 149-151.

*Primary Examiner*—Seema S. Rao
*Assistant Examiner*—John Shew
(74) *Attorney, Agent, or Firm*—DLA Piper Rudnick Gray Cary US LLP

(57) ABSTRACT

A person receiving a Voice over IP call, such as a call center agent, remotely controls media settings on a caller's multimedia terminal device functioning as a telephone terminal device. In some embodiments, the call center agent may remotely control media settings by entering a DTMF (dual tone multi-frequency) sequence from the telephone keypad. The DTMF sequence may be recognized by a gateway through which an Internet-to-PSTN call is made, stripped out of the audio stream and sent to the caller's multimedia terminal device in a separate command message through the Internet, or the DTMF sequence may be encoded into packets along with the voice information for detection and translation into a command message by software at the caller's terminal device. In pure VoIP applications, command packets may be sent directly. When a command message is received at the caller's terminal device, software on the end user computer makes the corresponding media setting changes without requiring any intervention on the part of the caller.

10 Claims, 6 Drawing Sheets

U.S. PATENT DOCUMENTS

| | | | |
|---|---|---|---|
| 5,786,770 A | 7/1998 | Thompson | |
| 5,790,538 A | 8/1998 | Sugar | |
| 5,835,713 A | 11/1998 | FitzPatrick et al. | |
| 5,838,665 A | 11/1998 | Kahn et al. | |
| 5,845,077 A | 12/1998 | Fawcett | |
| 5,848,146 A * | 12/1998 | Slattery | 379/406.01 |
| 5,850,433 A | 12/1998 | Rondeau | |
| 5,867,494 A | 2/1999 | Krishnaswamy et al. | |
| 5,867,495 A | 2/1999 | Elliott et al. | |
| 5,870,547 A | 2/1999 | Pommier et al. | |
| 5,870,610 A | 2/1999 | Beyda | |
| 5,875,296 A | 2/1999 | Shi et al. | |
| 5,883,891 A | 3/1999 | Williams et al. | |
| 5,889,774 A | 3/1999 | Mirashrafi et al. | |
| 5,892,764 A | 4/1999 | Riemann et al. | |
| 5,907,547 A | 5/1999 | Foladare et al. | |
| 5,909,545 A * | 6/1999 | Frese et al. | 709/208 |
| 5,919,247 A | 7/1999 | Van Hoff et al. | |
| 5,923,844 A | 7/1999 | Pommier et al. | |
| 5,941,957 A | 8/1999 | Ingrassia, Jr. et al. | |
| 5,944,791 A | 8/1999 | Scherpbier | |
| 5,953,322 A | 9/1999 | Kimball | |
| 5,953,331 A | 9/1999 | Duncan et al. | |
| 5,953,332 A | 9/1999 | Miloslavsky | |
| 5,956,334 A | 9/1999 | Chu et al. | |
| 5,970,065 A | 10/1999 | Miloslavsky | |
| 5,982,767 A | 11/1999 | McIntosh | |
| 5,987,102 A | 11/1999 | Elliott et al. | |
| 5,991,394 A | 11/1999 | Dezonno et al. | |
| 6,008,804 A * | 12/1999 | Pommier et al. | 345/753 |
| 6,011,792 A | 1/2000 | Miloslavsky | |
| 6,011,794 A | 1/2000 | Mordowitz et al. | |
| 6,026,087 A | 2/2000 | Mirashrafi et al. | |
| 6,031,896 A | 2/2000 | Gardell et al. | |
| 6,047,314 A | 4/2000 | Pommier et al. | |
| 6,049,671 A | 4/2000 | Slivka et al. | |
| 6,064,653 A | 5/2000 | Farris | |
| 6,064,667 A | 5/2000 | Gisby et al. | |
| 6,069,890 A | 5/2000 | White et al. | |
| 6,069,891 A | 5/2000 | Mandalia et al. | |
| 6,075,783 A | 6/2000 | Voit | |
| 6,075,784 A | 6/2000 | Frankel et al. | |
| 6,078,581 A | 6/2000 | Shtivelman et al. | |
| 6,078,582 A | 6/2000 | Curry et al. | |
| 6,118,864 A | 9/2000 | Chang et al. | |
| 6,122,255 A | 9/2000 | Bartholomew et al. | |
| 6,125,113 A | 9/2000 | Farris et al. | |
| 6,128,291 A | 10/2000 | Perlman et al. | |
| 6,141,341 A | 10/2000 | Jones et al. | |
| 6,141,345 A | 10/2000 | Goeddel et al. | |
| 6,144,670 A | 11/2000 | Sponaugle et al. | |
| 6,144,991 A | 11/2000 | England | |
| 6,199,096 B1 | 3/2001 | Mirashrafi et al. | |
| 6,212,192 B1 | 4/2001 | Mirashrafi et al. | |
| 6,298,056 B1 | 10/2001 | Pendse | |
| 6,304,637 B1 | 10/2001 | Mirashrafi et al. | |
| 6,310,941 B1 | 10/2001 | Crutcher et al. | |
| 6,665,293 B1 * | 12/2003 | Thornton et al. | 370/352 |
| 2004/0161095 A1 * | 8/2004 | Kredo et al. | 379/258 |

FOREIGN PATENT DOCUMENTS

| | | |
|---|---|---|
| EP | 0 866 596 | 9/1998 |
| WO | WO 98/20667 | 5/1998 |

* cited by examiner

REMOTE MEDIA CONTROL FOR VOICE OVER INTERNET TELEPHONY AND RELATED APPLICATIONS

BACKGROUND OF THE INVENTION

1. Field of the Invention

This invention relates to the provision of communications services using terminal devices that have adjustable audio controls.

2. Discussion of the Background

Users of personal computers (PCs) and other general purpose digital computing devices have been able to engage in voice communications using these devices for many years. One example of software for enabling PC-to-PC communication over the Internet is the SpeakFreely shareware which has been available since 1991. More recently, refined commercial grade products have emerged such as those offered by VocalTec, Net2Phone, Netspeak, and many others. By utilizing the Internet or other packet switched networks, such products have given rise to convergent voice and data solutions as well as created the potential for commercial applications in the realm of e-commerce.

The assignee of the present application, eStara Inc., has addressed some of the limitations of these solutions by inventing methods for installing and initializing media applications using a "thin client" model. These methods are described in U.S. patent application Ser. No. 09/272,139, entitled "Public Web Phone System," Ser. No. 09/637,805, entitled "Universal Internet Based Telephony System That Provides Ubiquitous Access For Subscribers From Any Terminal Device," and Ser. No. 09/771,993, entitled "Internet Telephony for e-Commerce." The contents of each of these applications are hereby incorporated herein by reference. These methods and processes created a particular opportunity for enabling PC users to make contact with call centers operated by merchants associated with a web site by clicking on icons displayed on web pages. The resulting voice connections link a PC user and a call center agent who may be using either a telephone or a voice-over-Internet enabled computer device.

In Internet telephony situations, the microphone and speakers of the end user's terminal device function like a telephone handset. In contrast to the typical telephone handset, however, the terminal device's microphone and speaker settings (such as volume control, tone, and muting) and echo cancellation/suppression features (collectively referred to herein as media settings), may not be optimized for a two-way or multi-party voice conversation. The quality of sound experienced by the person at the other end of the connection is affected by media control settings on the originating multimedia customer terminal device. Many casual users are not aware of the means to adjust these settings or may not know what settings are most conducive to a voice conversation. This is especially true in the e-commerce situation described above.

What is needed is a method to optimize media settings on an end-user terminal for Internet (or other data packet network) telephony.

SUMMARY OF THE INVENTION

The present invention meets the foregoing need to a great extent by providing a method and apparatus that allows a person receiving a Voice over IP call, such as a call center agent, to remotely control the media settings on the caller's multimedia terminal device functioning as a telephone terminal device. In some embodiments, particularly useful in e-commerce situations in which a call center agent receives a call from a caller through a Internet/PSTN gateway over the public switched telephone network, the call center agent may remotely control media settings by entering a DTMF (dual tone multi-frequency) sequence from the telephone keypad. The DTMF sequence may be recognized by the gateway, stripped out of the audio stream and sent to the caller's terminal in a separate command message through the Internet, or the DTMF sequence may be encoded into packets along with the voice information for detection and translation into a command message by the Internet telephony software at the caller's terminal. In "pure" VoIP applications (in which packets are directly exchanged between the calling and called parties), command packets may be sent directly. When a command message is received at the caller's terminal through any of these methods, software on the end user computer makes the corresponding media setting changes without requiring any intervention on the part of the caller.

BRIEF DESCRIPTION OF THE DRAWINGS

A more complete appreciation of the invention and many of the attendant advantages and features thereof will be readily obtained as the same becomes better understood by reference to the following detailed description when considered in connection with the accompanying drawings, wherein.

DESCRIPTION OF THE PREFERRED EMBODIMENTS

Figure 1:
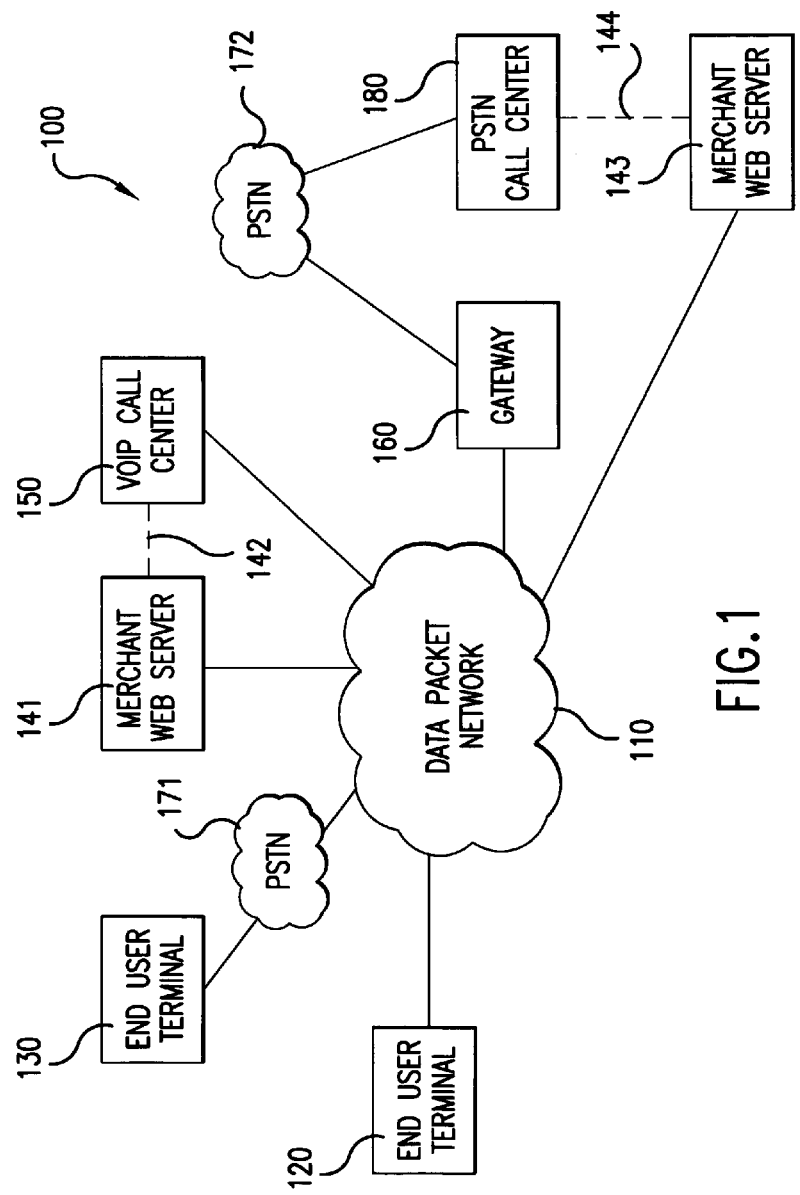
FIG. 1 is a block diagram illustrating an exemplary communication system incorporating the teachings of the present invention.

The present invention will be discussed with reference to preferred embodiments of remote media control applications. Specific details are set forth in order to provide a thorough understanding of the present invention. The preferred embodiments discussed herein should not be understood to limit the invention. Furthermore, for ease of understanding, certain method steps are delineated as separate steps; however, these steps should not be construed as necessarily distinct nor order dependent in their performance.

In Internet telephony applications, the microphone and speakers of the user's multimedia terminal device T1 function in a manner analogous to a telephone handset. If there is no headset on the customer terminal device and speakers are used to reproduce the voice of the other party, the audio output of the speakers can be picked up by the microphone, creating an acoustic echo. This acoustic echo is transmitted to the other party as a delayed echo of their voice. The acoustic echo is not heard by the end user at their multimedia terminal device and the end user is therefore unaware of the presence and severity of the acoustic echo. The acoustic echo makes it difficult to conduct a normal conversation and degrades the value of voice over Internet protocol applications that rely on multimedia PCs.

Acoustic echo can be corrected in two ways: by echo suppression (which disables the microphone when voice is being delivered through the speakers), or by echo cancellation (in which signal processing software "subtracts" the sound picked up from the speakers from the sound relayed from the microphone to the listener). Either method of correcting acoustic echo has shortcomings. Echo suppression methods typically create a half duplex connection, in which only one party can speak at a time. While preferable to the echo, a half duplex connection can seem choppy and is less desirable than a full duplex connection. One the other hand, echo cancellation is processor intensive and is particularly difficult in Internet telephony where both network latency and the acoustic configuration of the connecting PCs are variable.

The speaker and microphone settings of also have a great effect on the quality of an Internet telephony connection. For example, if a party placing a call from a multimedia terminal device to a standard telephone connected to the PSTN has their microphone turned down too low or turned up too high, the called party will experience difficulty. While some compensation may be made at the called party's telephone handset by adjusting the volume at the handset, the amount of compensation may not be sufficient. Thus, for example, where the caller's microphone volume is too low, turning the volume to maximum at the called party's handset may not be sufficient to allow the caller's voice to be heard. Furthermore, even if the called party's handset volume can be adjusted sufficiently so that the caller's voice may be heard, there may be additional distortion or interference as compared to a situation in which the caller's microphone volume was properly adjusted.

These problems are exacerbated in certain situations. For example, in the e-commerce arena, the assignee of the present invention has invented a service whereby an end user viewing a web site can simply click on a icon and automatically establish an Internet telephony call to a call center associated with the web site. In this service, the end user is automatically provided with Internet telephony software. This allows even the casual user who has never before attempted an Internet telephony call or previously installed any Internet telephony software to establish an Internet telephony call. In such situations, the end user may have no knowledge of echo suppression/cancellation features or of how to properly adjust the microphone and/or speakers for Internet telephony. Thus, the present invention provides a method and apparatus for remotely controlling these media settings.

Referring now to the drawings, wherein like reference numerals designate identical or corresponding parts throughout the several views, FIG. 1 illustrates a communications system 100 including a data packet network 110 such as the Internet. Connected to the data packet network are end user terminal 120 and end user terminal 130, which is connected to the data packet network 110 through the PSTN (public switched telephone network) 171 using a typical dial-up connection to an Internet service provider with a modem (not shown in FIG. 1). End users at the terminals 120, 130 may view web pages from a variety of sources, including merchant web servers 141, 143 which are also connected to the data packet network 110.

Each of the merchant web servers includes an icon for establishing a VoIP telephone call to an associated call center. Preferably, the icon causes an Internet telephony software application, which may be in the form of an applet, to be downloaded to an end user terminal 120, 130 and automatically establish the telephone call without requiring previously-installed software at the end user terminal 120, 130. When the web page and icon are provided by the merchant web server 141, a "pure" internet telephony call is established between the respective end user terminal 120, 130 and the VoIP-ready call center 150 associated with the merchant web server 141 (as indicated by dashed line 142). In this case, packets are exchanged between the respective end user terminal 120, 130 and the call center 150 directly through the data packet network 110 without using the PSTN (except for the portion of the PSTN 171 through which the end user terminal 130 is connected to the data packet network 110).

When the web page and icon are provided by merchant web server 143, the VoIP telephone call must be routed through a gateway 160 and the PSTN 172 to a conventional call center 180, which is not VoIP-ready, associated with the merchant web server 143 as indicated by the dashed line 144. In this situation, a packet is sent from an end user terminal 120, 130 to the gateway 160. The gateway 160 unpacks the packet, converts the digital information to analog form, and transmits it to the call center 180 over the PSTN 172 (PSTN 171 and PSTN 172 may be part of the same public switched telephone network, but are shown separately in FIG. 1 for the purposes of illustration). The gateway also receives voice information in analog form from the PSTN call center 180, digitizes and packetizes the analog information, and sends the packets to the appropriate end user terminal 120, 130.

As discussed above, the media settings on an end user terminal 120, 130 may require adjustment for a call to a call center 150 or 180. The following describes how this may be accomplished in either of these situations.

Remotely Controlling Media Settings Using Telephone Touch-Tone Sequences

Figure 2:
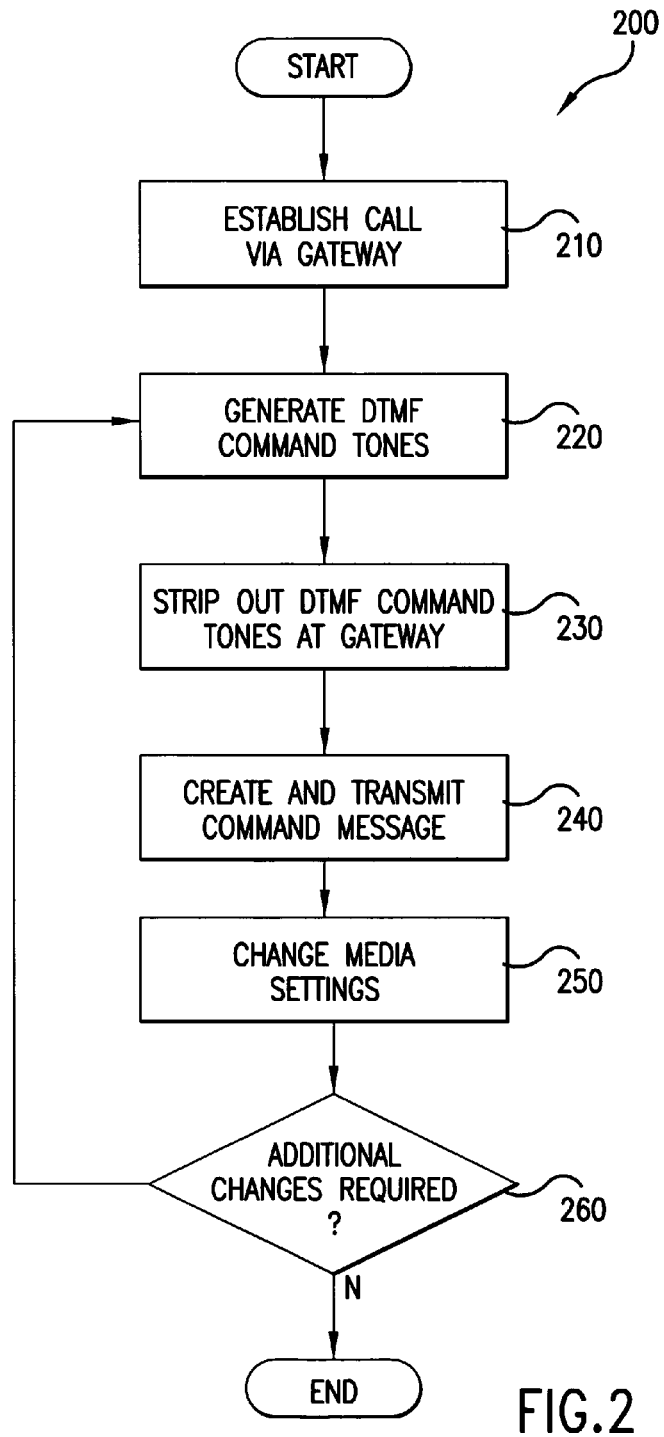
FIG. 2 is a flow chart illustrating the operation of remote media controls using telephone device touch-tones in accordance with one embodiment of the present invention.

One technique, which is especially useful in a call to a PSTN call center 180, is to enable the representative at call center 180 to remotely control the media settings at end user terminal 120, 130 using DTMF tones generated by the call center representative with, for example, a telephone keypad. The technique is illustrated by the flowchart 200 of FIG. 2. The Internet telephone call to PSTN call center 180 through the gateway 160 is established at step 210. This may be accomplished in any variety of ways, including those discussed above. If the agent at the call center 180 determines that a change to a media setting is required, the agent generates a DTMF sequence using the touch-tone dialpad at step 220. Various touch-tone sequences represent different commands (e.g., *22 could mean increase microphone volume by 20%; *82 could mean reduce speaker volume by 20%; *55 could mean enable echo cancellation; etc.). The gateway 160 is equipped to detect DTMF sequences. Upon detecting a DTMF sequence, the gateway 160 removes the DTMF sequence from the digitized and packetized data that is sent to the terminal 120, 130 at step 230. This prevents the end user from hearing the DTMF sequence, which prove annoying to some end users. The gateway 160 then creates a corresponding digital command message and transmits it to the terminal 120, 130 at step 240. This command message may form part of a packet containing digitized voice data, or may be sent in a separate packet. The terminal 120, 130 receives the command packet and makes the corresponding change to the media settings at step 250. If additional changes are required at step 260, the agent generates an additional DTMF sequence at step 220 and the process is repeated.

Figure 3:
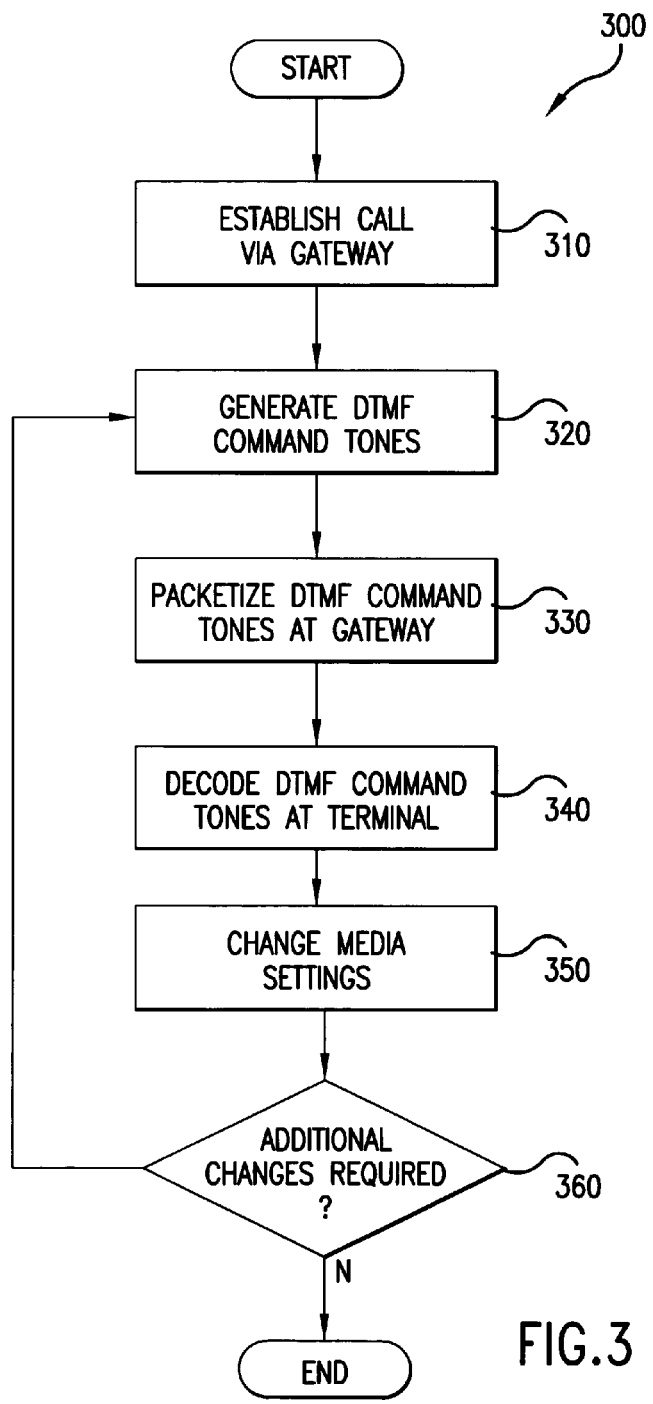
FIG. 3 is a flow chart illustrating the operation of remote media controls using telephone device touch-tones in accordance with a second embodiment of the present invention.

In the above-described embodiment, the gateway 160 must be equipped to detect the DTMF sequences and translate them into corresponding command messages. Where such specially equipped gateways 160 are not available or practical, a second technique illustrated by the flowchart 300 in FIG. 3 may be used. The call to the call center 180 is established through the gateway 160 at step 310. When a media setting change is required, the agent generates the appropriate DTMF command sequence at step 320 in the manner described above. The gateway 160, rather than detecting and stripping the DTMF sequence out as above, simply digitizes and packetizes the DTMF command sequence along with the other voice data at step 330. The packets are transmitted to the terminal 120, 130, which decodes the DTMF command sequence at step 340 and makes the corresponding media setting changes at step 350. If additional changes are required at step 360, steps 320 et seq. are repeated for the additional changes.

An important advantage to this embodiment is that it does not require a specially-equipped gateway 160. However, it does suffer from some disadvantages as compared to the embodiment wherein DTMF command sequences are detected at the gateway. First, detecting the DTMF command sequences at the gateway avoids the problem of missing tones due to packet loss. Second, detecting DTMF command sequences at the gateway avoids the inaccuracies that can be caused by variations in compression technologies on the packet switched and circuit switched (i.e., PSTN) networks. The choice between the two techniques will be application dependent.

Remotely Controlling Media Settings Using Computer-Displayed Controls

Figure 4:
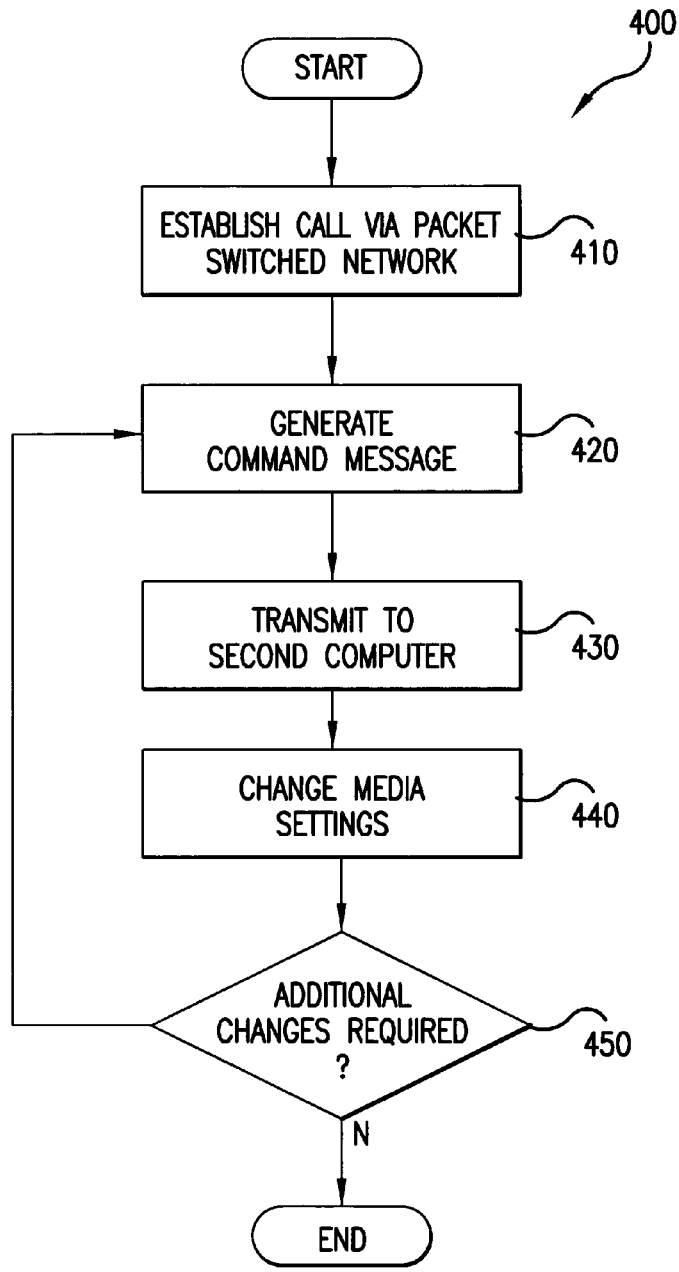
FIG. 4 is a flow chart illustrating the operation of remote media controls using computer displays in accordance with a third embodiment of the present invention.
Figure 5:
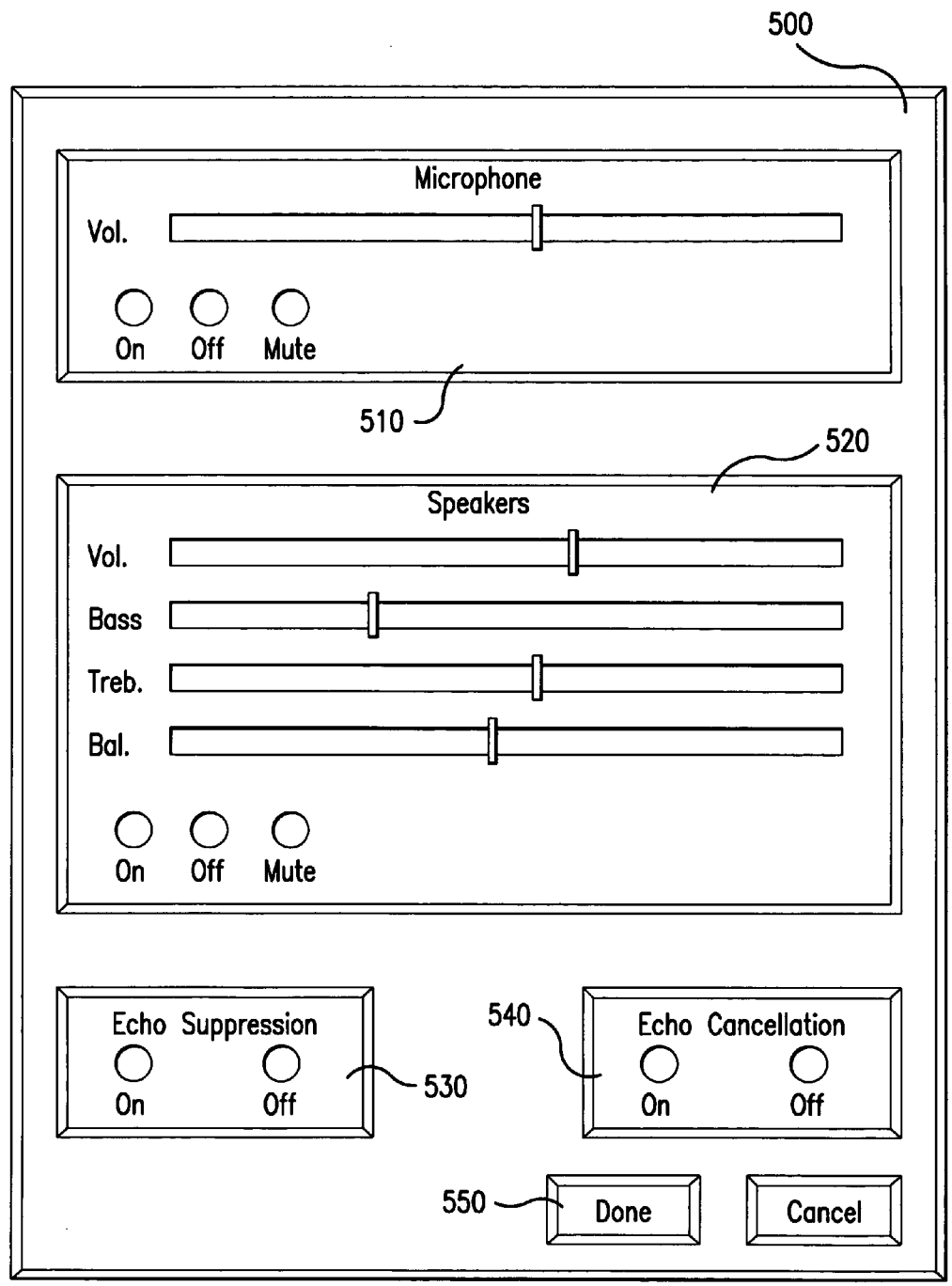
FIG. 5 is a diagram of a command message window used with the method described in the flowchart of FIG. 4.

A second technique, which is especially useful in "pure" VoIP call to a VoIP-ready call center 150 wherein the call center representative will receive the call on a multimedia computer terminal, is to provide a call center agent with a display with through which automated media setting commands may be generated and sent to an end user terminal 120, 130. This technique is illustrated in flowchart 400 of FIG. 4. At step 410, an Internet telephony call between an end user terminal 120, 130 and a call center 150 is established through the Internet without use of a gateway 160. If a media setting change at the end user terminal 120, 130 is necessary, the agent opens a media setting change window 500, as shown in FIG. 5. The agent then adjusts one or more controls such as microphone controls 510, speaker controls 520, echo suppression controls 530 and echo cancellation controls 540. The agent presses the "Done" button 550 when finished making the desired adjustments, which causes a command message to be generated at step 420. The command message is transmitted from the call center 150 terminal to the end user terminal 120, 130 at step 430. The end user terminal 120, 130 receives the command message and makes the corresponding change in media settings at step 440. If additional changes are necessary at step 450, steps 420 et seq. are repeated as necessary.

Remotely Controlling Media Settings Using Pre-Programmed Controls

The media application resident on an end user communication terminal device 120, 130 that is configured for remote media control could also be adjusted using pre-programmed controls built into communications software. This principle is embodied in two ways in the present invention: as pre-programmed default settings, or in dynamically determined adjustments based on the results of pre-programmed tests.

As an example of the default approach, in a voice over Internet application, the applet (or other software program) that is downloaded and installs a PC-based media application at the start of a call automatically adjusts the Windows (or other operating system) sound drivers to set the microphone input level at 80%, a level that was selected as the best default setting for Internet telephony applications. At the conclusion of an Internet telephony connection, the applet restores the Windows sound drivers to the settings in effect prior to the connection.

Figure 6:
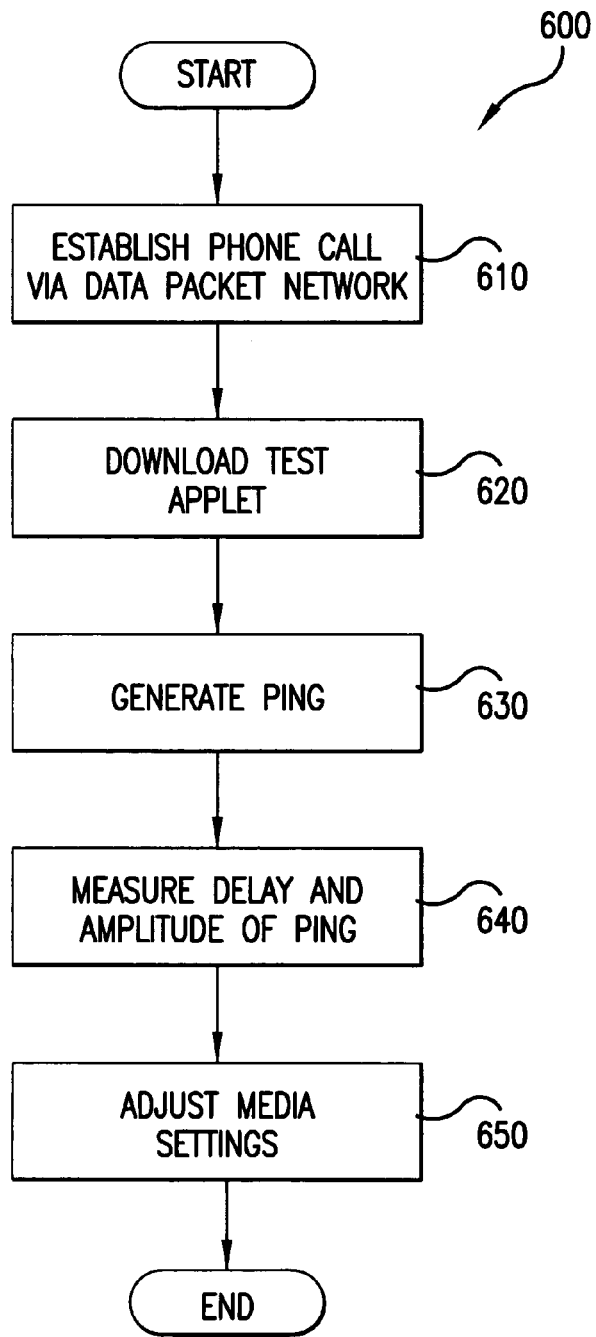
FIG. 6 is a flowchart illustrating a self-test method for adjusting media controls according to a fourth embodiment of the present invention.

In an example of a test-driven approach, illustrated in the flowchart 600 of FIG. 6, a phone call is established between an end user terminal 120, 130 and a call center 150 at step 610. A test applet, which may be separate from or included with an applet that establishes the call, is downloaded to the end user terminal 120, 130 at step 620. Under control of the applet, the end user terminal 120, 130 generates a "ping" or other audible sound at the terminal 120, 130 at step 630. The ping is detected by a microphone at the end user terminal 120, 130 and the amplitude and delay is measured at step 640. The applet uses this data to calculate appropriate media settings including echo suppression parameters in a manner well known in the art.

The presence of a self-test capability also enables a remote server to make appropriate decisions regarding the communications process. In the previous example of the "ping test," for example, if no sound were detected at the microphone input port the test failure would trigger a message from the server to the device user indicating that either the PC speakers were inoperative or that a microphone was either not installed or not operating. (It should be noted that, even when a headset is used, the ping sounded through the headset speakers will be detected at the headset microphone.) The end user is then advised to make appropriate adjustments or to use a fallback communications approach.

Each of the above examples was discussed in the context of a simple two-party call. It will be readily understood by those of skill in the art that the techniques discussed herein may easily be extended to multiple party conference calls. In such embodiments, the end user terminals of each participant are assigned a temporary address (e.g., 1, 2, 3, etc.), and media change command messages include an address for each participant.

Obviously, numerous modifications and variations of the present invention are possible in light of the above teachings. It is therefore to be understood that within the scope of the appended claims, the invention may be practiced otherwise than as specifically described herein.

What is claimed is:

1. A method for configuring a remote computer for a voice over data packet network call comprising the steps of:
   downloading an applet to an end user computer;
   executing the applet at the end user computer, the applet being operable to cause an audible tone at a predetermined volume to be produced by a speaker connected to the end user computer and adjust a media setting in accordance with a time delay between the audible tone and a sound corresponding to the audible tone detected by a microphone connected to the end user computer.

2. The method of claim 1, wherein the media setting is echo suppression.

3. The method of claim 1, wherein the media setting is echo cancellation.

4. The method of claim 1, wherein the media setting is microphone volume.

5. The method of claim 1, wherein the media setting is speaker volume.

6. A method for configuring a remote computer for a voice over data packet network call comprising the steps of:

downloading an applet to an end user computer;

executing the applet at the end user computer, the applet being operable to cause an audible tone at a predetermined volume to be produced by a speaker connected to the end user computer and adjust a media setting in accordance with an amplitude of a sound corresponding to the audible tone detected by a microphone connected to the end user computer.

7. The method of claim 6, wherein the media setting is echo suppression.

8. The method of claim 6, wherein the media setting is echo cancellation.

9. The method of claim 6, wherein the media setting is microphone volume.

10. The method of claim 6, wherein the media setting is speaker volume.

\* \* \* \* \*